United States Patent
Limbert et al.

[11] Patent Number: 6,130,978
[45] Date of Patent: Oct. 10, 2000

[54] COUPLING OF OPTIC FIBERS

[75] Inventors: Mark John Limbert, Great Dunmow; Paul Irven, Feltham, both of United Kingdom

[73] Assignee: Transradio Limited, Middlesex, United Kingdom

[21] Appl. No.: 09/106,679

[22] Filed: Jun. 29, 1998

[30] Foreign Application Priority Data

Jun. 30, 1997 [GB] United Kingdom ................. 9713855

[51] Int. Cl.⁷ ...................................................... G02B 6/36
[52] U.S. Cl. ................................ 385/87; 385/86; 385/81
[58] Field of Search ................................ 385/81, 86, 87, 385/89, 92, 136

[56] References Cited

U.S. PATENT DOCUMENTS

| | | | |
|---|---|---|---|
| 4,447,120 | 5/1984 | Borsuk | 385/136 |
| 4,693,550 | 9/1987 | Brown et al. | 385/87 |
| 5,283,848 | 2/1994 | Abendschein et al. | 385/59 |
| 5,533,157 | 7/1996 | Coutts | 385/53 |
| 5,559,817 | 9/1996 | Ott | 385/86 |
| 5,835,653 | 11/1998 | Barkus | 385/86 |

FOREIGN PATENT DOCUMENTS

| | | | |
|---|---|---|---|
| 0011561 | 5/1980 | European Pat. Off. | 385/81 |
| 0250910 | 10/1989 | Japan | 385/62 |
| 2 042 817 | 9/1980 | United Kingdom | H02G 15/02 |
| 2119954 | 11/1983 | United Kingdom | 385/81 |

*Primary Examiner*—Cassandra Spyrou
*Assistant Examiner*—John Juba, Jr.
*Attorney, Agent, or Firm*—Cantor Colburn LLP

[57] ABSTRACT

Tension is relieved on a coupling of an optical fiber by crimping a sleeve over an end portion of the tension-resistant sheath of the optic fiber lead to produce a narrowed portion, non-parallel sided in section. This is inserted and entrapped axially rotationally and radially in a retainer which is secured within a backshell by grub screws. A collar is fitted to entrap the grub screws. The lead is supported behind the retainer by a resilient block.

11 Claims, 4 Drawing Sheets

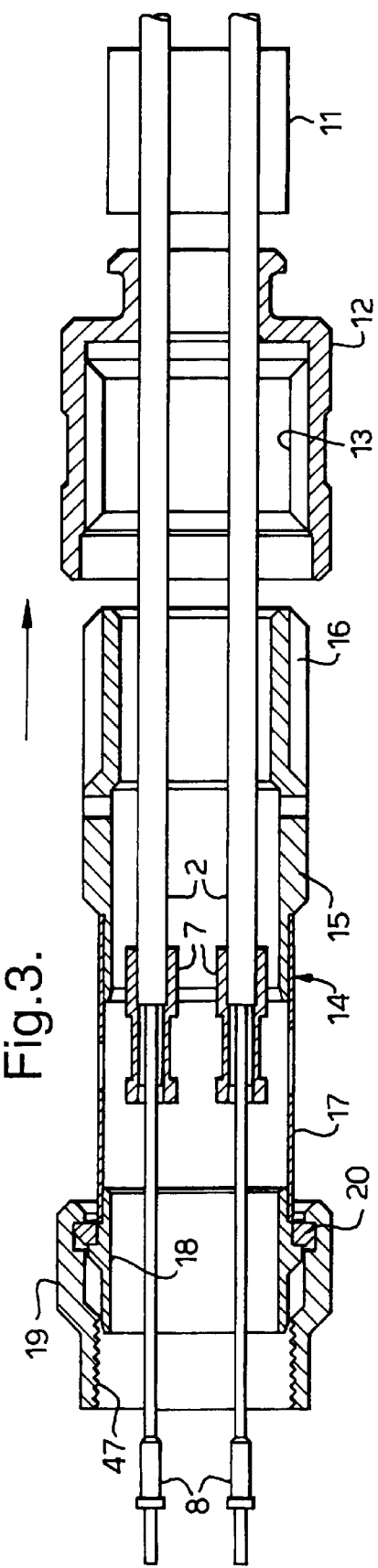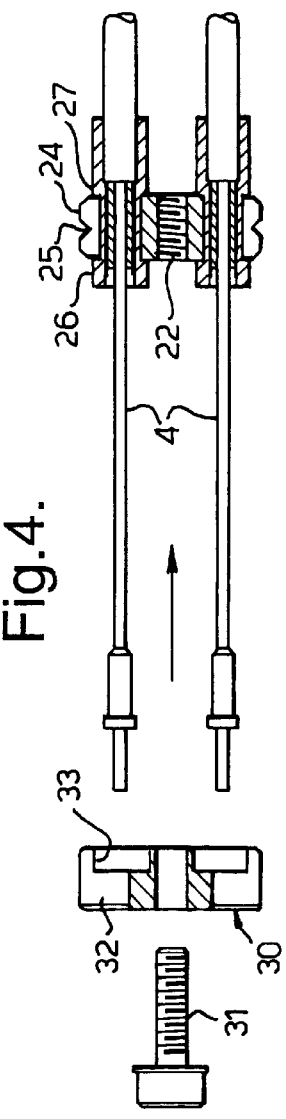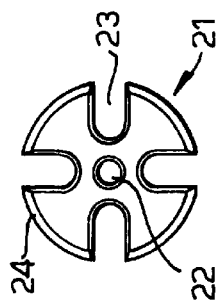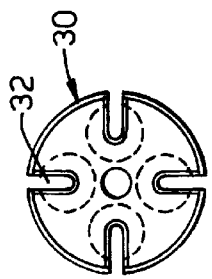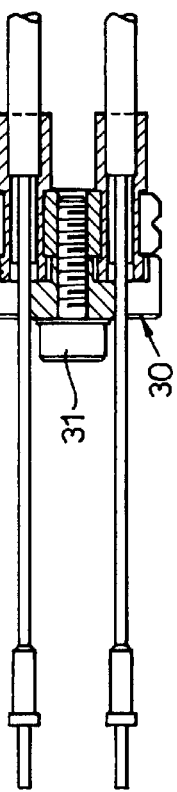

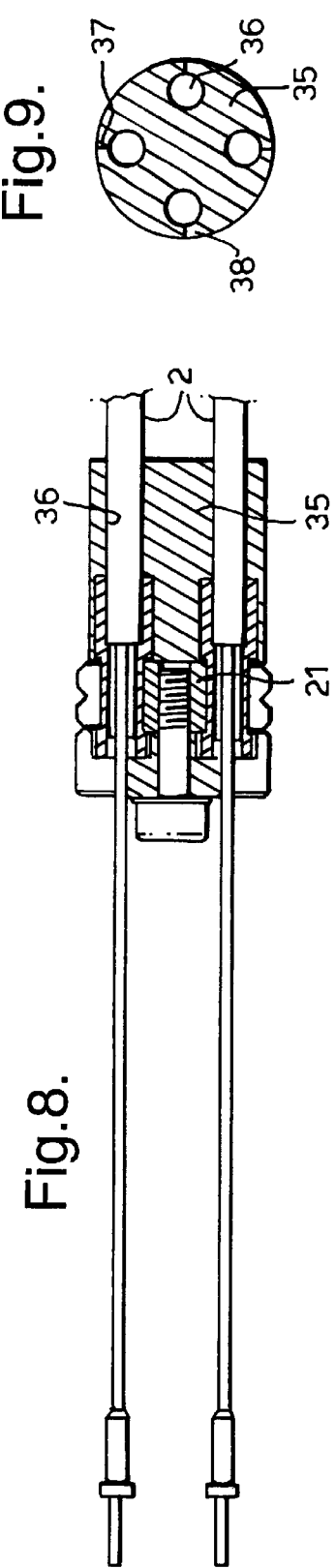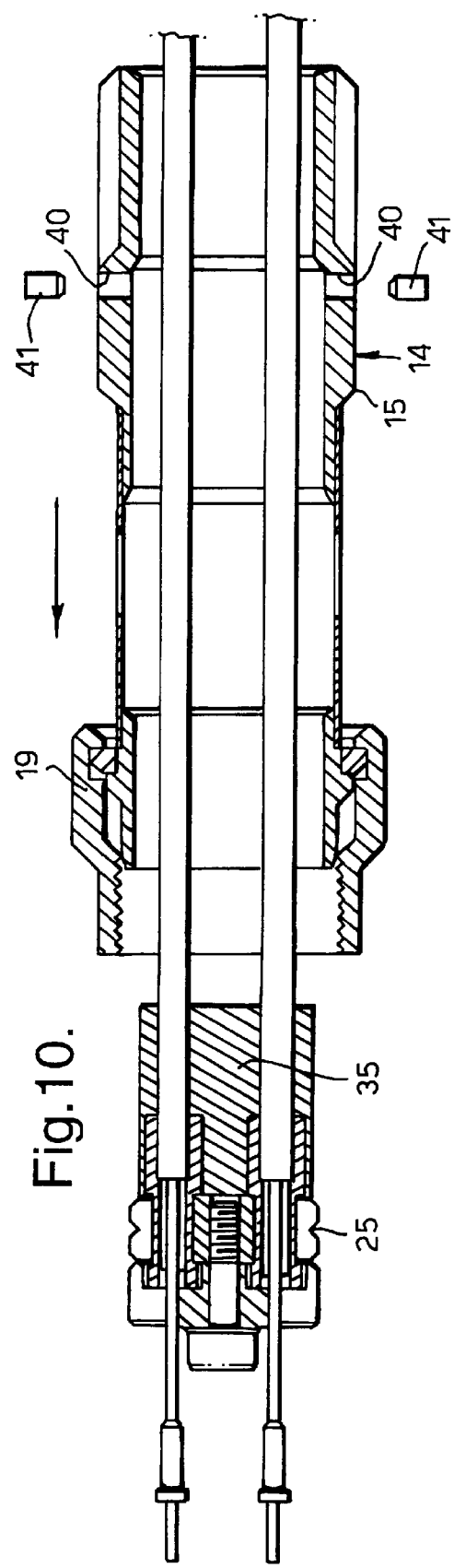

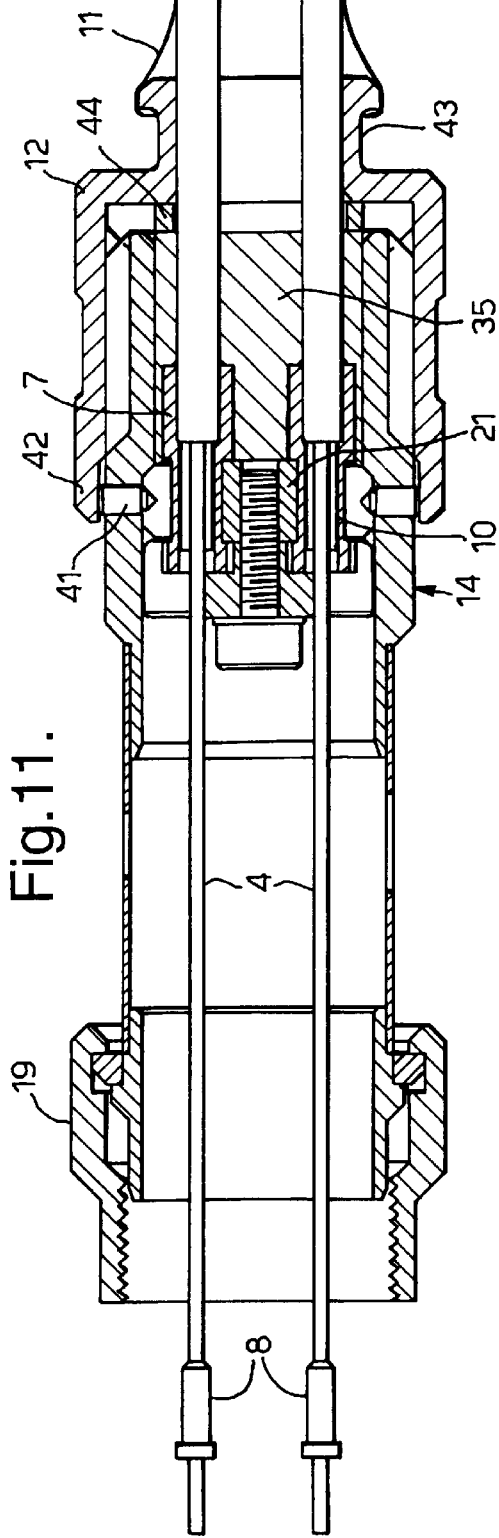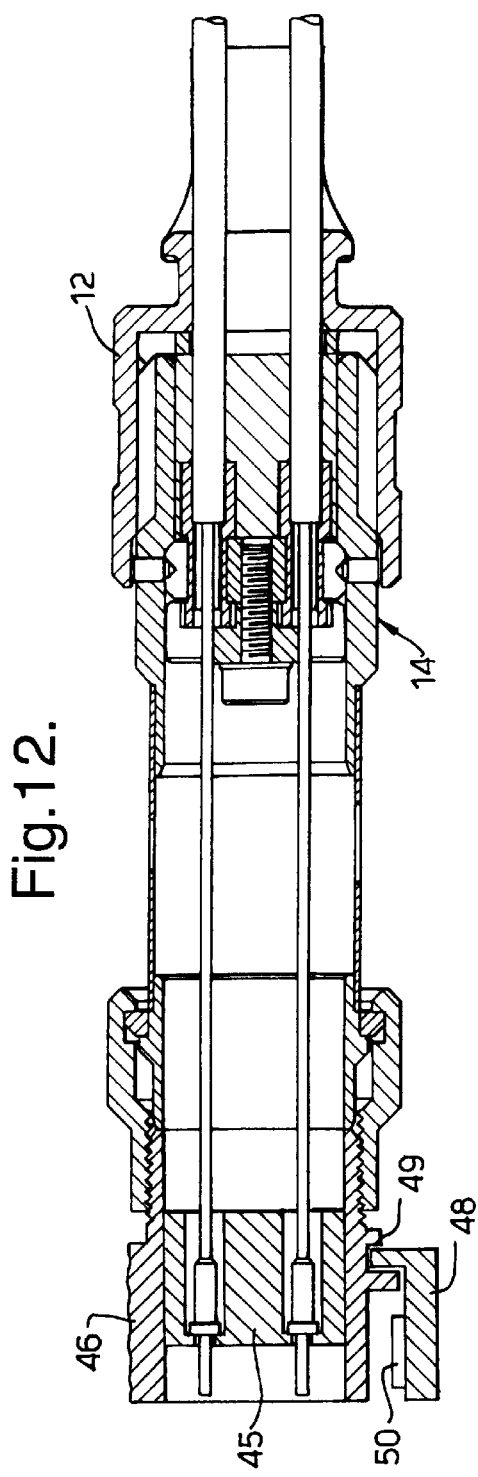

COUPLING OF OPTIC FIBERS

FIELD OF THE INVENTION

This invention relates to couplings for optical fibers, and in particular to the relief of strain in such couplings.

BACKGROUND OF THE INVENTION

For that purpose an integer called a backshell has been provided. In one way or another this bridges over the male and female members of the coupling so that any tension on the optic lead or leads is not transferred to the joint between those members.

The present construction is intended to deal with one or more problems of particular relevance to optic fiber technology—the need to avoid twisting, tension is on the fragile optic fiber and sharp deviations in the fibers.

SUMMARY OF THE INVENTION

In the present invention, a crimp is formed at an end of a protective sheath of an individual optic lead of the type of optic fiber lead known as "ruggedized". That is it has an outer sheath around a buffer layer outside the fiber optic, with the sheath having protective function and including a strength member capable of withstanding tension. The crimp is formed in such a way that it is in a tension-transmitting relation with that lead. It has non-circular cross section; and a retainer is provided in which there is at least one recess of a complementary cross section so that the crimp cannot rotate in it. The crimp(s) of the fiber(s) are received and secured in the respective recess(es). A preferred conformation for the crimps is parallel-sided polygonal, with the recesses being parallel-sided and arranged radially of a circular-periphery retainer. A backshell having coupling means at one end (for coupling e.g. to another backshell or to a base) is positioned around the retainer and secured to it. Thus, tension on the optic lead is transferred through a tension-transmitting reinforcement of the lead via the crimp retainer and backshell to whatever the backshell is coupled to.

The optic fiber itself will usually project from the crimp and have a ferrule fitted in any suitable manner, the ferrules of a plurality of optic fibers, when present, being collected in a conventional connector; however the coupling through the backshell relieves the connector of tension. The free length of optic fiber beyond the crimp should be appropriate to the length of the backshell beyond the crimp so that when the backshell is coupled there is enough fiber to allow connection with a little slack, so as to ensure that no tension is exerted at the connector.

If as is preferred the backshell itself is a loose fit over the optic fiber sheath(s) behind the crimp(s) little or no radial pressure will be exerted by it on them, avoiding kinking or other sudden deviations due to radially inward pressure; however, there may be a resilient element between the sheath(s) and the backshell, with a resilient block radially to support the sheath(s) against the resilience of the sleeve. The element and block may be integral.

However, the backshell itself or an attachment to it may include a curved duct for guiding the lead(s) in a controlled and appropriate radius of curvature around a desired angle from that at which it or they are received in the retainer.

The retainer may include a disc body part having the recess(es) for receiving the crimp(s) and a cap for holding the optic fiber(s) in a retained relationship. The rim of the disc is preferably peripherally grooved with the groove being the means of engagement of the backshell with the retainer for example by means of grub screws, the grub screws being covered by an external sleeve.

The invention includes both the coupling and a method of assembling it. In preferred embodiments the coupling is also able to be non-destructively disassembled.

DESCRIPTION OF THE DRAWINGS

A particular embodiment of the invention will now be described with reference to the accompanying drawings, wherein:

FIG. 3 is a diametrical section showing backshell components being passed over the optical fibers;

FIG. 4 is a diametrical section of the next stage of assembly and

FIG. 5 is a face view on a retainer part seen in FIG. 4;

FIG. 6 is a diametrical section of the next stage of assembly and

FIG. 7 is a face view on a retainer cap seen in FIG. 6;

FIG. 8 shows a next stage of assembly with a rubber bung fitted and

FIG. 9 is a section through the rubber bung;

FIG. 10 shows a backshell being brought up for assembly with the remaining parts;

FIG. 11 shows an assembled backshell and optical fiber; and

FIG. 12 shows a fully completed coupling with the backshell coupled to receive tension.

DESCRIPTION OF A PREFERRED EMBODIMENT

Figure 1:
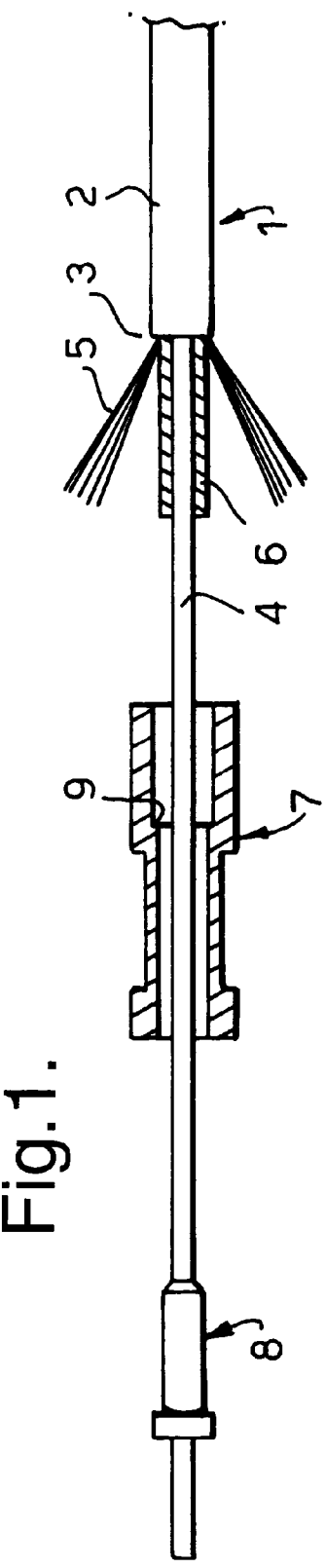
FIG. 1 is a diametrical section showing the first stage of assembly of an optical fiber to a backshell and FIG. 2 shows a second stage.
Figure 2:
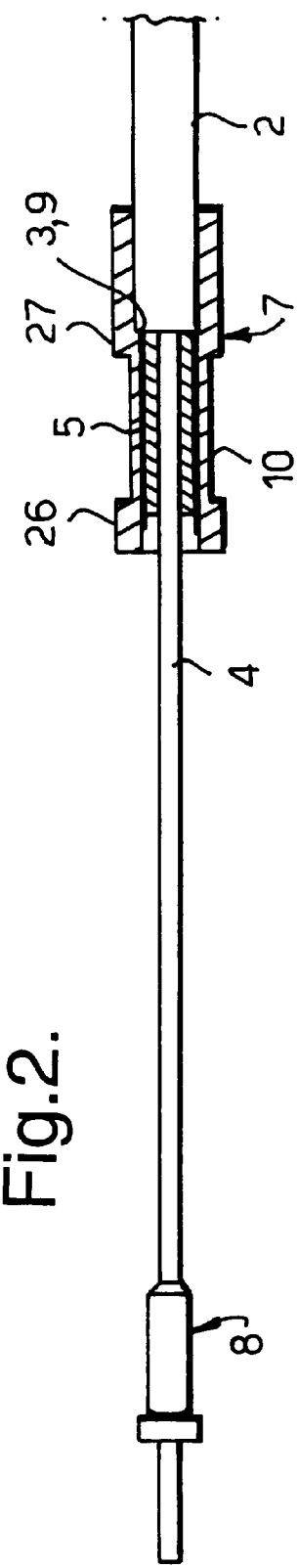

In FIG. 1, an optic fiber lead 1 is treated by having its outer sheath 2 and inner buffer coating (not shown) stripped off at a position 3 a given distance from an end of the optic fiber 4. A high tensile strength reinforcement layer 5, for example of Kevlar® fiber is left projecting beyond the point 3 for a certain length. A buffer sleeve 6 is slid onto the fiber 4 and also a crimp sleeve 7. A ferrule 8 is then assembled to the end of the optic fiber 4 in conventional manner.

In a second stage of assembly, the Kevlar® fibers 5 are brought down onto the buffer sleeve 6 and the crimp sleeve 7 slid until an internal shoulder 9 within it butts up against the end of the outer sheath 2 at position 3. A narrowed portion 10 of the crimp sleeve is then crimped in a manner known per se in a non-circular configuration in cross section, preferably having at least two parallel sides in cross-section, as in a parallel-sided polygonal cross section such as a hexagon. The fiber 4 is protected by the buffer sleeve 6.

The entrapment of the reinforcement fibers 5 by the crimped portion 10 means that the crimp sleeve 7 is now united tensionally with the optical fiber sheath.

This process is repeated for the number of optical fibers of which the final assembly is to be made. In the example to be described there are four of these but only two are seen in the diametrical sections which make up most of the Figures.

FIG. 3 shows two such fiber leads 1, to each of which has been attached a crimping sleeve 7 in the manner which has just been described and over which are being passed from the free end over those sleeves (that is, to the right as shown in the Figure) in succession a heat shrink sleeve 11, a coupling nut 12 with internal screw fitting 13, and a backshell sub-assembly 14 including a body part 15 having on one end an external screw threading 16 for screw threaded engagement with threading 13 on the nut 12, a tubular portion 17 and an end fitting 18 upon which coupling element 19 is rotatable. A circlip 20 allows assembly together of the parts 18,19 by expanding into a gap between shoulders on those parts 18,19 after 19 has been passed over 18.

The parts 11,12,14 are passed away down the optic fibers 2 to be clear during the operations next to be described.

In the next stage of assembly, the optic fibers are fitted in a retainer 21. This includes a disc with a screw threaded central aperture 22 and with parallel-sided radial slots 23 recessed into its circumference. The outer periphery of the disc has peripheral ridges 24 forming between them a peripheral groove 25.

The tangential width of the slots 23 is approximately equal to the cross sectional width of the parallel-sided crimped narrowed portion 10 of the sleeve so that the portion may fit non-rotatably into the former and be retained against axial movement by abutment of the forward and rearward portions 26,27 of the sleeves 7, which are wider than the narrowed portion, against the respective faces of the disc 21.

To hold the crimp sleeves and hence the optic fibers radially in the disc 21 a retainer cap 30 is provided which can be assembled to the disc by a bolt 31 engageable in the screw threaded aperture 22 of the disc.

This cap has radial slots 32 which are narrower than slots 23, being of a tangential width only enough for the passage through them of the optical fibers 4. The cap 30 has a flange 33 which entraps radially the forward enlarged part 26 of the crimp sleeves retained by the retainer disc 21.

As seen in FIG. 8, a bung 35 of rubber or similar resilient material is now placed over the fiber sheaths 2 and the rearward portions 27 of the crimp sleeves. This bung has a through passage 36 through it, one for each of the optic fiber leads and the enlarged parts 27 of the sleeves 7 to be received. To allow the leads to be placed in position, each through passage 36 has a cut 37 uniting it to the outer periphery of the bung, so that lips 38 formed outside the through passages can be pushed outwards to allow insertion, in a radially inward direction, of the sheaths 2.

The bung is pushed up snugly behind the rear face of the disc 21.

In the next stage, the backshell sub-assembly 14 is brought back over the retainer and bung assembly moving leftwards as seen in FIG. 10, until screw threaded diametrical ports 40 in the body part 15 are in register with the grooves 25 of the retainer. In this position, grub screws 41 with frusto-conical heads are threaded home so that their heads are engaged into the groove as seen in FIG. 11 and thus a unitary assembly is formed whereby tension experienced between the coupling ring 19 or 18 and the leads 1 is not communicated in any way to the bare optical fibers 4 but rather is transmitted via body part 15, grub screws 41, groove 25, disc 21 and crimp sleeves 7 to the tensional reinforcement fibers 5 of the optical fiber leads.

In a final stage of assembly of the backshell, the coupling nut 12 is brought up and screwed onto the screw threading 16 until as seen in FIG. 11 a cylindrical lip 42 of the nut covers over the exposed outer ends of the grub screws 41 preventing accidental access to them or loosening of them. A cylindrical spacer 44 presses against the end of the bung 35. If desired, the heat shrink sleeve 11 may now be shrunk over a projecting boss 43 on the coupling nut 12 so as to provide a seal and a disincentive to any rotation of the nut. The boss 43 may be extended, or have an extension fitted to it, to guide the leads 1 away from the backshell in, for example, a desired smooth curve.

The ferrules 8 of the fibers 4 are collected together in a known terminal connector element 45 so as to be insertable together as the male or the female part of a conventional optic fiber coupling. This is contained within a conventional terminal head 46 which is secured to the backshell assembly by screw-threaded engagement with internal threading 47 in the coupling element 19. End serrations or castellations on the head 46 engaged with complementary serrations or castellations on the free end of end fitting 18 so as to prevent relative rotation. A coupling nut 48 is rotatable about the head 46 in groove 47, and can be secured to a socket part by internal threading 50 to hold the whole of the connector and backshell assembly to, for example, a wall based terminal, or another similar terminal connector and backshell assembly.

The completed assembly is shown in FIG. 12 and it can be seen how by use of the retainer 21 and non-symmetrical cross sectional crimpings, the backshell provides at the same time for the avoidance of rotation of the optical fibers or their sheaths and for the transmission of any tension experienced by the optical fiber leads not to the terminal connector element such as 45 but rather through the crimp retainer and backshell assembly to the coupling parts surrounding the conventional connector.

It is a further advantage of the embodiment described that it is reversible in the sense that it may be deliberately disassembled non-destructively (except, if provided, for the shrunk heat seal sleeve 11, which is comparatively trivial).

What is claimed is:

1. An optical fiber coupling for at least one optic fiber lead having a tension-resistant sheath, the coupling including a crimp sleeve on an end portion of the sheath and having a crimp of non-circular cross-section in tension-transmitting relationship with the lead, a retainer fixedly receiving the crimp in a receptacle of a shape complementary to the non-circular cross-section and a backshell in tension-transmitting relationship with the retainer.

2. An optical fiber coupling according to claim 1 wherein the cross-section of the crimp is parallel-sided and the receptacle is parallel-sided.

3. An optical fiber coupling according to claim 2 wherein the retainer includes a disc with an indentation in its periphery as the receptacle, and means on the periphery of the disc for engaging with the backshell, portions of said sleeve wider than said non-circular cross-section crimp respectively abutting faces of said disc.

4. An optical fiber coupling according to claim 3 wherein the retainer has a cap fitted at one axial side, and having a flange, the cap retaining the crimp axially and radially in the retainer disc.

5. An optical fiber coupling according to claim 3 wherein the sheathed optical fiber is radially supported within the backshell and behind the retainer by a resilient block.

6. An optical fiber coupling according to claim 3 wherein the engaging means on the periphery of the disc is a groove and the backshell is engaged with the groove by the head of a grub screw.

7. An optical fiber coupling according to claim 6 wherein the backshell includes a collar screw-threadedly assembled on it such that a flange of the collar entraps the grub screw.

8. An optical fiber coupling according to claim 3 wherein the retainer has a cap fitted at one axial side of the disc, and having a flange, the flange retaining the crimp radially in the indentation of the retainer.

9. An optical fiber coupling for a plurality of optic fiber leads each having a tension-resistant sheath, the coupling including a crimp sleeve at an end portion of each sheath crimped for forming a narrowed crimp portion in a tension-transmitting relationship with its lead and having a non-circular cross-section, a retainer receiving the crimp portions in a receptacle of a shape complementary to the non-circular cross-section and a backshell in tension-transmitting relationship with the retainer.

10. An optical fiber coupling according to claim 9 wherein the retainer includes a disc and wherein the cross-section of each crimp portion is a parallel-sided polygon and each receptacle is a parallel-sided radially-directed slot in the disc.

11. An optical fiber coupling according to claim 9 including a fiber-optic connector positioned in relation to the backshell, a length of each fiber optic between the connector and the crimp sleeve within the backshell, said length being such as to isolate the connector from tension.

* * * * *